(12) United States Patent
VanDeurzen et al.

(10) Patent No.: US 7,902,300 B2
(45) Date of Patent: Mar. 8, 2011

(54) CONTROLLED RHEOLOGY POLYPROPYLENE HETEROPHASIC COPOLYMERS

(75) Inventors: Philippe VanDeurzen, Lennik (BE); Lisa K. Albe, Seneffe (BE); William Wheat, Houston, TX (US); Michel Daumerie, Houston, TX (US)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/396,635

(22) Filed: Mar. 3, 2009

(65) Prior Publication Data

US 2009/0171034 A1 Jul. 2, 2009

Related U.S. Application Data

(63) Continuation of application No. 10/363,972, filed as application No. PCT/EP01/10350 on Sep. 7, 2001, now abandoned.

(30) Foreign Application Priority Data

Sep. 8, 2000 (EP) .................................... 00203099

(51) Int. Cl.
*C08F 8/06* (2006.01)
*C08F 8/50* (2006.01)
*C08K 5/14* (2006.01)

(52) U.S. Cl. ..................................... 525/333.8; 525/387
(58) Field of Classification Search ............... 525/333.8, 525/387
See application file for complete search history.

(56) References Cited

U.S. PATENT DOCUMENTS

| | | | |
|---|---|---|---|
| 3,887,534 A | 6/1975 | Baba et al. | |
| 4,493,923 A | 1/1985 | McCullough, Jr. | |
| 4,704,524 A | 11/1987 | Masaki et al. | |
| 4,705,818 A | 11/1987 | Kawai et al. | |
| 4,707,524 A | 11/1987 | Ehrig et al. | |
| 4,734,448 A | 3/1988 | Kasahara et al. | |
| 5,447,985 A | 9/1995 | DeNicola, Jr. et al. | |
| 5,459,201 A | 10/1995 | Shroff et al. | |
| 5,530,073 A | 6/1996 | Schoenberg | |
| 5,602,206 A | 2/1997 | Gunesin et al. | |
| 5,656,691 A | 8/1997 | Niki et al. | |
| 5,705,568 A | 1/1998 | Gahleitner et al. | |
| 5,840,808 A | 11/1998 | Sugimura et al. | |
| 5,932,660 A * | 8/1999 | Meijer et al. | 525/256 |
| 6,015,854 A | 1/2000 | McCullough, Jr. | |
| 6,358,435 B1 | 3/2002 | Schuurman et al. | |
| 6,610,792 B2 | 8/2003 | Albe et al. | |
| 6,723,829 B1 | 4/2004 | Malm et al. | |

FOREIGN PATENT DOCUMENTS

| | | |
|---|---|---|
| CA | 2110441 A1 | 12/1993 |
| EP | 0597461 A2 | 5/1994 |
| EP | 1 186 618 A1 | 3/2002 |
| FR | 2193840 A1 | 2/1974 |
| JP | 48079851 A1 | 10/1973 |
| JP | 07033916 | 2/1995 |
| KR | P19990075714 A1 | 10/1999 |
| WO | 96/20247 A1 | 7/1996 |
| WO | 97/49759 A1 | 12/1997 |
| WO | 01/36502 A1 | 5/2001 |
| WO | 03/042257 A1 | 5/2003 |

OTHER PUBLICATIONS

Ryu, S.H., et al., "Parameters Affecting Process Efficiency of Peroxide-Initiated Controlled Degradation of Polypropylene", Advances in Polymer Technology, John Wiley and Sons, Chichester, GB, XP000323082; ISSN: 0730-6879, vol. 11, No. 2, 1991, pp. 121-131.
Roegiers, Kristien, U.S. Appl. No. 11/401,189, filed Apr. 10, 2006, "Impact Strength Polypropylene,".
Y. Feng and J.N. Hay, "Phase Separation in a Commercial Block Propylene-Ethyleme Copolymer," vol. 39, (1998) 5277-5280.
"Polypropylene Handbook," (E.P. Moore Jr., Ed.), 1999, p. 92.

* cited by examiner

*Primary Examiner* — Roberto Rabago
(74) *Attorney, Agent, or Firm* — Diane L. Kilpatrick-Lee

(57) ABSTRACT

This invention relates to the use of a cyclic ketone peroxide of half-life time larger than one second at a temperature of 225° C., for producing a controlled rheology polypropylene heterophasic copolymer of melt index MI2 larger than 15 g/10 min, having simultaneously a very high impact resistance and a high flexural modulus.

11 Claims, 3 Drawing Sheets

CONTROLLED RHEOLOGY POLYPROPYLENE HETEROPHASIC COPOLYMERS

This application is a continuation of application Ser. No. 10/363,972, having a filing date of Feb. 10, 2005, now abandoned which was the National Stage of International Application No. PCT/EP2001/010350, filed Sep. 7, 2001, which claimed priority from EP Application No. 00203099.7, filed Sep. 8, 2000, and is now abandoned.

The present invention relates to polypropylene heterophasic copolymers modified with cyclic ketone peroxides in order to better control their impact strength.

Several processes for increasing the impact strength of polypropylene (co)polymers are known in the art, for example, by modifying said (co)polymers with elastomeric modifiers or with peroxides.

Where elastomeric modifier is used to modify the (co) polymers, it can be added in either of the following ways:

reactor polymerisation of polypropylene heterophasic copolymers. These polypropylene heterophasic copolymers exhibit typical heterophasic morphology consisting of ethylene propylene bipolymer spherical domains dispersed in a semi-crystalline polypropylene matrix. This material consists generally of three components: a polypropylene homopolymer, a rubbery ethylene propylene bipolymer and a crystalline ethylene-rich ethylene propylene bipolymer. The amount and properties of the three component material are controlled by the process conditions. The mechanical properties of the final product are influenced for example by:

1. the molecular weight, molecular weight distribution and tacticity of the propylene homopolymer matrix;
2. the molecular weight and molecular weight distribution of the ethylene propylene rubber phase;
3. the ethylene/propylene ratio of the ethylene propylene rubber phase;
4. the content and dispersion of the optional ethylene rich ethylene propylene bipolymer;
5. the size and distribution of the rubber phase domains;
6. the melt viscosity ratio of the propylene matrix and rubber phase components.

Melt blending polypropylene (co)polymers with elastomeric modifiers to prepare polypropylene heterophasic copolymers. Elastomers such as ethylene propylene rubber (EPR) or ethylene propylene diene monomer (EPDM) provide improved impact behaviour. The impact resistance of these compositions depends upon the content, the composition and the morphology of the elastomeric modifier.

Both methods have been described for example in: "Polypropylene, structure, blends and composites. Volume 2—Copolymers and blends. Edited by J. Karger-Kocsis, Published in 1995 by Chapman § Hall.

WO-95/111938 discloses a process of modifying (co)polymers by contacting them with a peroxide compound containing an activated unsaturated group and an acid group in the presence of a polymer reinforcing material, or prior to the addition of a polymer reinforcing material. The primary object of that invention was to modify (co)polymers in order to introduce an adhesion promoting functional group- and to improve their properties. The resulting modified (co)polymers have improved impact strength, flexural strength, tensile strength and elongation at break, increased melt flow index and the other properties equal those of the unmodified impact (co)polymers.

WO-97/49759 discloses a process for enhancing the melt strength of a propylene (co)polymer by the steps of:

mixing an initiator with the propylene (co)polymer at a temperature below the decomposition temperature;

then heating the mixture above the initiator decomposition temperature in order to decompose the initiator before the polymer has melted and in order to react the radicals created by the decomposition with the polymer.

WO-96103444 discloses a process for modifying (co)polymers by contacting these with an organic peroxide, some of said peroxide being decomposed. Cyclic ketone peroxides have been found particularly efficient in the modification processes. They have been employed in the degradation of polyolefins, the cross-linking of polyolefins, the dynamic cross-linking of blends of elastomers and thermoplastic polymers, the grafting of monomers onto polymers, or the functionalisation of polyolefins. The resulting modified (co)polymers had a larger melt flow index, a lower weight average molecular weight and a narrower molecular weight than the starting (co)polymers, while keeping an adequate melt strength.

WO-00/23434 discloses a composition comprising a cyclic ketone peroxide and a phlegmatizer having a 95% boil-off point falling in the range of 220-265° C. Preferably, the peroxide is a cyclic ethyl ketone peroxide and a single phlegmatiser is used.

U.S. Pat. No. 4,707,524 discloses the use of peroxides that do not decompose to tert-butyl alcohol and have a half-life in the range of 1 to 10 hours at 128° C. for controlling the molecular weight and molecular weight distribution of polypropylene.

WO-96/03397 discloses a transportable, storage stable ketone peroxide composition which comprises 1 to 90 wt % of one or more cyclic ketone peroxides and 10 to 99 wt % of one or more diluents selected from the group consisting of liquid phlegmatisers for the cyclic ketone peroxides, plasticisers, solid polymeric carriers, inorganic supports, organic peroxides and mixtures thereof.

WO-96/20247 discloses cross-linked polymer compositions of propylene-ethylene copolymer and ethylene-α-olefin copolymer prepared by melting and kneading the constituents in the presence of a radical forming agent, a cross-linking agent and eventually a peroxide inhibitor. These compositions were characterised by a high impact strength and a high flexural modulus.

EP-0,208,330 discloses a propylene polymer composition with increased whitening resistance and increased impact strength, obtained by addition of an ester, in the presence of a peroxide, during extrusion.

None of these prior art documents discloses polypropylene heterophasic copolymers having simultaneously a melt flow index MI2 larger than 15 g/10 min and increased impact strength, while keeping adequate rigidity.

It is an aim of the present invention to provide polypropylene heterophasic copolymers exhibiting simultaneously high melt flow index and high impact strength.

It is another aim of the present invention to provide polypropylene heterophasic copolymers with very high impact resistance over a large range of temperatures.

It is a further aim of the present invention to obtain polypropylene heterophasic copolymers with controlled rheology.

It is yet another aim of the present invention to obtain a material with an optimal balance of stiffness, impact strength and melt flow.

This invention discloses a polypropylene (co)polymer degraded with a cyclic ketone peroxide characterised in that it retains an Izod notched impact strength for melt flow indices larger than 15 g/10 min that is at least 50% higher than that of a polypropylene (co)polymer degraded with a linear peroxide under similar conditions.

Preferably, the impact strength of the degraded polypropylene (co)polymer of the present invention retains an Izod notched impact strength that is twice as large as that of the prior art resins.

This invention also discloses the use of cyclic ketone peroxide, to degrade a polypropylene (co)polymer, for producing a controlled rheology material of melt index MI2 larger than 15 g/10 min, said impact propylene copolymer having simultaneously an impact resistance that is at least 50% higher and a flexural modulus that is 30 Mpa higher than those of the polypropylene (co)polymers degraded with linear peroxides under similar conditions.

The half-life time of the cyclic ketone peroxides of the present invention is typically longer than one second at a temperature of 225° C., preferably it is of from 2 to 10 seconds at a temperature of 225° C., and most preferably, it is about 4 seconds at a temperature of 225° C.

The half-life time of peroxide is defined as the time required to decompose one half of the molecules at a given temperature, and thus a less reactive peroxide has a longer half-life time. A longer half-life time has two favourable consequences:

1. the peroxide decomposes more slowly; there is thus more time for mixing with the polymer melt in the extruder resulting in a more homogeneous material;
2. there is at any time a lower radical concentration, reducing the probability of side reactions.

Reducing the extrusion temperature increases the half-life time of the peroxide.

The melt index MI2 is measured using the method of standard test ISO 1133 at 230° C. and under a load of 2.16 kg, the flexural modulus is measured using the method of standard test ISO 178 and the impact strength is the Izod notched impact strength measured according to the methods of standard test ISO 180.

The process for preparing a controlled rheology polypropylene heterophasic copolymer by degrading a polypropylene with a cyclic ketone peroxide, comprises the steps of:

either a) Reactor polymerising a polypropylene heterophasic copolymer;

b) Extruding the polypropylene heterophasic copolymer of step a), with said cyclic ketone peroxide and optionally with one or more filler(s), in an extruder, at a temperature sufficient to maintain the copolymer in the molten state;

Or c) Extruding a polypropylene (co)polymer with said cyclic ketone peroxides, and optionally, with one or more elastomeric modifier(s) and/or one or more filler(s), in an extruder, at a temperature sufficient to maintain the copolymer in the molten state.

The specific group of cyclic ketone peroxide of half-life time longer than one second at a temperature of 225° C., can be represented by either of the general formulae:

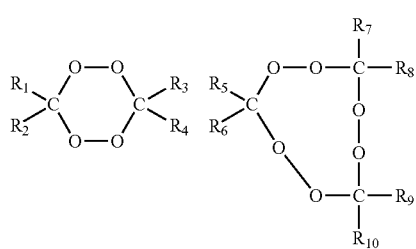

-continued

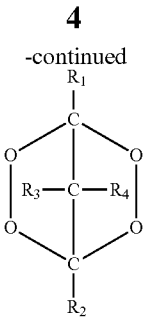

Wherein $R_1$-$R_{10}$ are independently selected from the group consisting of hydrogen, $C_1$-$C_{20}$ alkyl, $C_3$-$C_{20}$ cycloalkyl, $C_6$-$C_{20}$ aryl, $C_7$-$C_{20}$ aralkyl, $C_7$-$C_{20}$ alkaryl, which groups may include linear or branched alkyl moieties; and each of $R_1$-$R_{10}$ may be optionally substituted with one or more groups selected from hydroxy, $C_1$-$C_{20}$ alkoxy, linear or branched $C_1$-$C_{20}$ alkyl, $C_6$-$C_{20}$ aryloxy, halogen, ester carboxy, nitrile, and amino.

Preferably, the peroxide is a cyclic peroxide containing at least two peroxide groups, and most preferably, it is 3,6,9-triethyl-3,6,9-trimethyl-1,4,7-triperoxonane. The latter molecule has three peroxide groups and a relatively small number of carbon atoms and thus a level of active oxygen of the order of 18.16 wt %.

The treatment of a polypropylene with peroxide generally produces a modified polymer by creation of functional groups. Peroxide radicals can cause chain scission and/or cross-linking, resulting in an increase of the melt flow index. It must be noted however that increasing the degradation ratio causes a decrease of the flexural modulus. The amount of peroxide necessary to carry out the invention depends upon the chemical nature of the peroxide, upon the starting melt flow index and upon the desired final melt flow index: it is directly proportional to the final melt flow index. Melt flow index of from 2 to 70 g/10 min have been obtained, but the efforts of the present invention are focused on products having a melt flow index larger than 15 g/10 min. The main departure from the strength and stiffness behaviour of prior art materials occurs for resins having a melt flow index above 15 g/10 min.

In a preferred embodiment of the present invention, the polypropylene heterophasic copolymer is prepared by copolymerising propylene with ethylene in the proportions of from 5 to 20 wt % of ethylene and 95 to 80 wt % of propylene. The copolymerisation is effected in two reactors as follows:

a) the catalyst and propylene are charged into a first loop reactor equipped with a circulation pump, at a temperature of from 60 to 80° C. and under a pressure of from 35 to 40 bars, using the liquid monomer as a suspension vehicle, in order to produce a homopolymer of propylene on the surface of the catalyst grains;

b) the polymer-coated catalyst grains are transferred to one or more secondary gas phase reactors with a fluidised bed and ethylene is added in order to produce an ethylene-propylene rubber.

The polypropylene heterophasic copolymer so obtained has a typical heterophasic morphology consisting of ethylene-propylene bipolymer spherical domains dispersed in a semi-crystalline polypropylene matrix. These materials generally consist of three components: a propylene homopolymer, a rubbery ethylene-propylene bipolymer and a crystalline ethylene-rich ethylene-propylene bipolymer. The amount and properties of the components are controlled by the process conditions and the physical properties of the resulting material are correlated to the nature and amount of the three components. In the present invention, the preferred amount of ethylene is of from 9 to 15 wt % and more preferably, it is from 11 to 14 wt %. The polypropylene heterophasic copolymer is then extruded in an extruder with a cyclic ketone peroxide and with one or more optional fillers, such as glass fillers, talc, calcium carbonate or clay minerals. The cyclic ketone peroxide has a half-life time longer than one second at a temperature of 225° C. The extrusion is carried out at a temperature sufficient to maintain the material in a molten state. In the examples carried out with the preferred peroxide of the present invention, the extrusion temperatures are from 160° C. up to less than 200° C., preferably from 160 to 190° C. The resin obtained after degradation of the polypropylene (co)polymer at low temperature exhibit an excellent impact performance. That result is totally unexpected as it is generally known in the art to work at temperatures higher than 200° C. with long half-life time peroxides, in order to compensate for their low reactivity level. It must be noted in addition that the resins prepared according to the present invention retain higher impact strength than prior art resins, for extrusion temperatures higher than 200° C.

The Izod notched impact strength of the final resin depends upon the amount of ethylene present in the polypropylene heterophasic copolymer: it increases with increasing amounts of ethylene. The rigidity, on the contrary, decreases with increasing amounts of ethylene, thereby imposing an upper limit to the amount of ethylene incorporated into the copolymer.

It is further observed, that the final resins obtained according to the present invention, when extruded at cold temperature, retain an Izod notched impact strength at 23° C. above 40 kJ/m$^2$, for melt flow indices ranging from 15 to 40 g/10 min and for an ethylene content of from 9 to 15 wt % in the polypropylene heterophasic copolymer. For an ethylene content in the polypropylene heterophasic copolymer larger than 12 wt % and an extrusion temperature of at most 200° C., the impact strength of the compositions according to the present invention remains above 40 kJ/m$^2$ for melt flow indices up to 70 g/10 min. Throughout this disclosure, cold extrusion temperature is understood as a temperature ranging from the temperature at which all components are in the molten state up to a temperature of less than 200° C.

In addition, it is also observed that both the extrusion temperature and the percentage of ethylene contained in the polypropylene heterophasic copolymer have an influence on the behaviour of the Izod notched impact strength as a function of melt flow index. Decreasing the extrusion temperature or increasing the amount of ethylene results in final resins that retain the impact properties at values of the melt flow index larger than 40 g/10 min. It is thus possible, playing with these two parameters to tailor the desired final resins.

The copolymers of the present invention are used in several applications that require simultaneously a melt flow index larger than 15 g/10 min, high impact strength and high flexural modulus such as for example: crates, ice cream containers, yoghurt beakers, storage bins, suitcases, lids, pails, technical parts, garden articles, automotive parts, batteries, thin wall packaging, medical waste containers and compounds. Compounds are particularly valuable as they allow the production of articles with less or no elastomeric modifiers thereby allowing reduction of cost and processing time.

LIST OF FIGURES

EXAMPLE 1

Several samples have been prepared using as starting material a polypropylene heterophasic copolymer having a melt flow value MI2 of 2 g/10 min and an ethylene content of 11.3 wt %. The polypropylene heterophasic copolymer has been extruded in a single-screw Gloenco extruder, at a temperature of 200° C., with various amounts of the cyclic peroxide 3,6,9-triethyl-3,6,9-trimethyl-1,4,7-triperoxonane in a 41.3% solution of Isopar M diluent and having 7.5 wt % of active oxygen, in order to obtain the desired melt flow index for the finished material. The formulation of these materials contains in addition Irganox and Irgafos as antioxidants, 400 ppm of calcium stearate, 3500 ppm of talc and 2000 ppm of glycerol monostearate (GMS) as antistatic agent. The data are summarised in Table I.

TABLE I

| Cyclic peroxide consumption (ppm) | Final MFI (g/10') |
|---|---|
| 350 | 7.2 |
| 700 | 12 |
| 900 | 24.7 |
| 1380 | 37.9 |
| 1810 | 56 |
| 2110 | 73.4 |

The flexural modulus has been measured at 23° C. using the method of standard test ISO 178 and the Izod notched impact strength has been measured at 23° C. using the method of standard test ISO 180. The results are summarised in Table II and in FIG. 1.

COMPARATIVE EXAMPLES

The same polypropylene heterophasic copolymer as that used hereabove has been extruded with various amounts of 2,5-bis(tert-butylperoxy)-2,5-dimethylhexane sold by Akzo Nobel Chemicals B.V. under the trade-name Trigonox 101 under the same conditions as in Example 1. The amounts of peroxide have been adjusted in order to produce finished materials with comparable melt flow indices of respectively 8, 12, 27.2, 38.2, 63.5 and 74, as those of the samples according to the invention. The amounts of peroxide consumed are respectively 250, 500, 800, 1060, 1390 and 1650 ppm. The flexural modulus and Izod notched impact strength are also presented in Table II and FIG. 1 for comparison.

TABLE II

| Perox. | 101* | cycl* | 101 | cycl | 101 | cycl | 101 | cycl | 101 | cycl | 101 | cycl |
|---|---|---|---|---|---|---|---|---|---|---|---|---|
| MFI g/10' | 8 | 7.2 | 12 | 12 | 27.2 | 24.7 | 38.2 | 37.9 | 63.5 | 56 | 74 | 73.4 |
| Flex. Mod. Mpa | 1160 | 1216 | 1050 | 1120 | 1040 | 1065 | 1000 | 1036 | 965 | 1000 | 945 | 995 |
| Izod 23° C. kJ/m$^2$ | 56.5 | 60.7 | 19 | 54 | 207 | 51 | 13.2 | 21.1 | 12.7 | 15.1 | 11.7 | 14.3 |

*101 = Trigonox 101 and cycl = 3,6,9-triethyl-3,6,9-trimethyl-1,4,7-triperoxonane.

Figure 1:
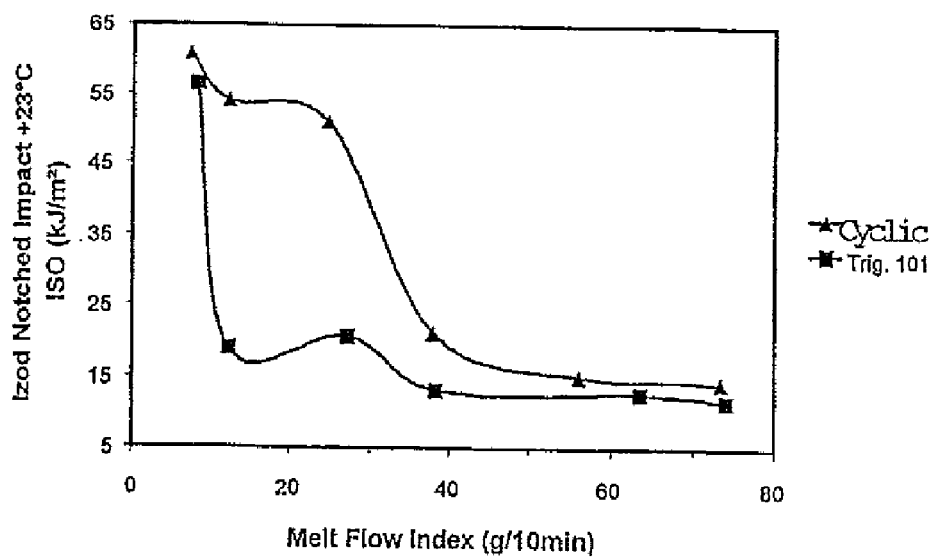
FIG. 1 represents a plot of the Izod notched impact strength at 23° C., expressed in kJ/m$^2$, as a function of the melt flow index, expressed in g/10 min, for an ethylene content in the polypropylene heterophasic copolymer of 11.3 wt % and for an extrusion temperature of 200° C.

From Table II and FIG. 1, it appears that the material produced according to the present invention has a flexural modulus that is larger by about 40 MPa than that of the material produced with Trigonox 101 for melt indices larger than 15 g/10 min.

From Table II and FIG. 1, it is observed that the Izod notched impact strength at 23° C., of the material produced according to the present invention, quite unexpectedly does not decrease sharply for a melt flow index larger than 15 g/10 min as does the material prepared with Trigonox 101. It remains fairly high up to a value of the melt index of about 40 g/10 min. Above that value, it remains significantly higher than that of the comparative samples.

EXAMPLE 2

Figure 2:
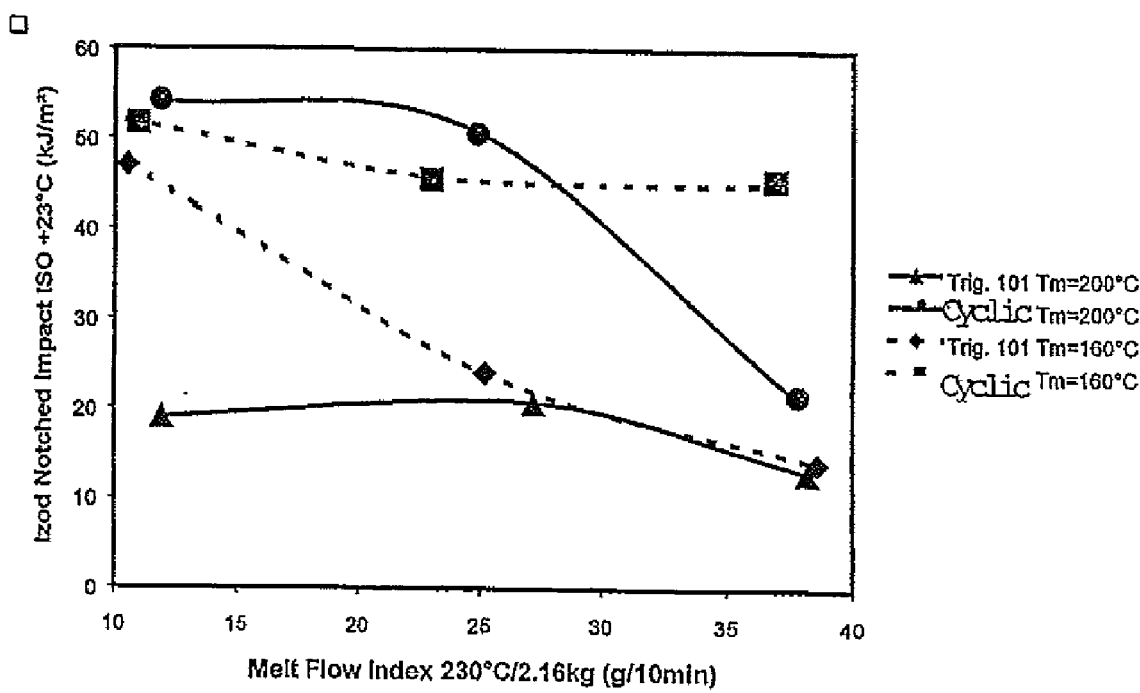
FIG. 2 represents a plot of the Izod notched impact strength at 23° C., expressed in kJ/m$^2$ as a function of the melt flow index, expressed in g/10 min, for an ethylene content in the polypropylene heterophasic copolymer of 11.3 wt % and for extrusion temperatures of 160° C. and of 200° C.

The Izod notched impact strength has been measured, at the temperatures 23, 10 and −20° C., for melt indices of 12, 25 and 40, for extrusion temperatures of 160, 180 and 200° C. and for two peroxides. The controlled rheology polypropylene heterophasic copolymer samples according to the present invention have been prepared with an ethylene content of 11.3 wt % and with the same cyclic ketone peroxide as that used in example 1. The comparative examples have been prepared with the linear peroxide sold by Akzo Nobel Chemicals B.V. under the name Trigonox 101. The results are summarised in Table III and in FIG. 2.

TABLE III

Izod notched impact strength (kJ/m$^2$) at 23° C., 10° C. and −20° C.

| Peroxide | MFI | Ex. T. = 200° C. | | | Ex. T. = 180° C. | | | Ex. T. = 160° C. | | |
|---|---|---|---|---|---|---|---|---|---|---|
| | | 23 | 10 | −20 | 23 | 10 | −20 | 23 | 10 | −20 |
| 101 | 12 | 19 | na | 6 | 45* | 13 | 6 | 47* | 13 | 6 |
| 101 | 25 | 20 | na | 8 | 32** | 10 | 6 | 24** | 10 | 6 |
| 101 | 40 | 13 | na | 7 | 14 | 8 | 5 | 14 | 9 | 5 |
| cyclic | 12 | 54* | na | 7 | 51* | 43* | 6 | 52* | 42* | 7 |
| cyclic | 25 | 51* | na | 7 | 48* | 13 | 6 | 46* | 13 | 6 |
| Cyclic | 40 | 21 | na | 8 | 45* | 11 | 6 | 45* | 11 | 6 | na: not available
*no break
**no break of some samples

It can be concluded from these results that the material prepared according to the present invention has an impact strength that is superior to that of the comparative samples, in all cases. The results are particularly remarkable at low extrusion temperatures of 160 and 180° C.

EXAMPLE 3

Figure 3:
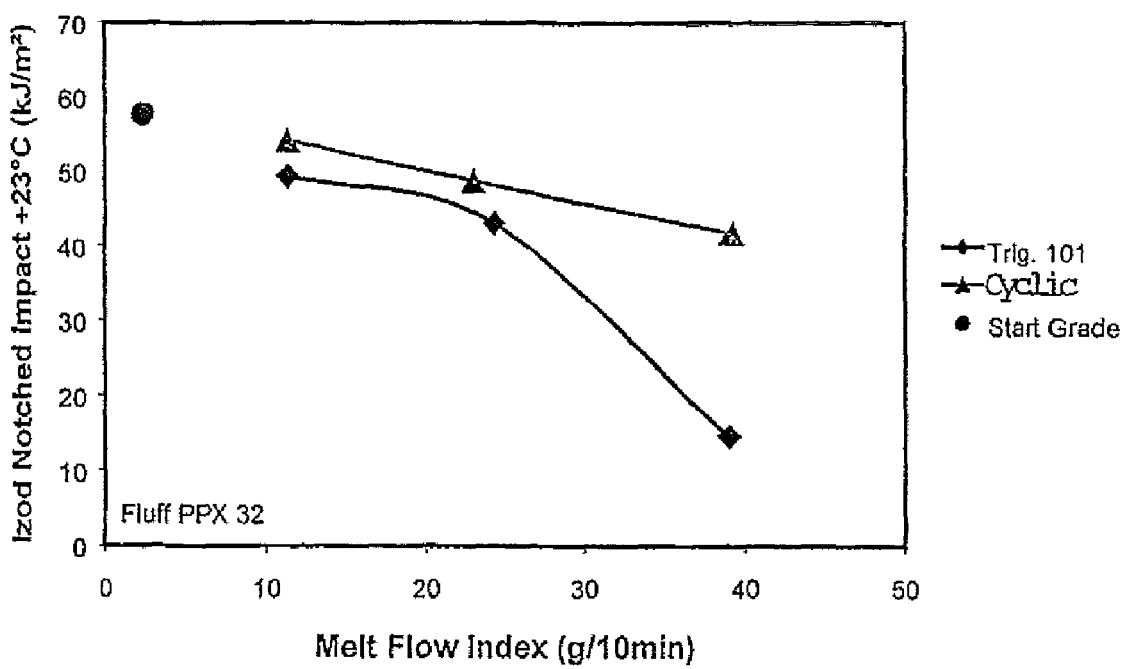
FIG. 3 represents a plot of the Izod notched impact strength at 23° C., expressed in kJ/m$^2$, as a function of the melt flow index, expressed in g/10 min, for an ethylene content in the polypropylene heterophasic copolymer of 13.2 wt % and for an extrusion temperature of 200° C.
Figure 4:
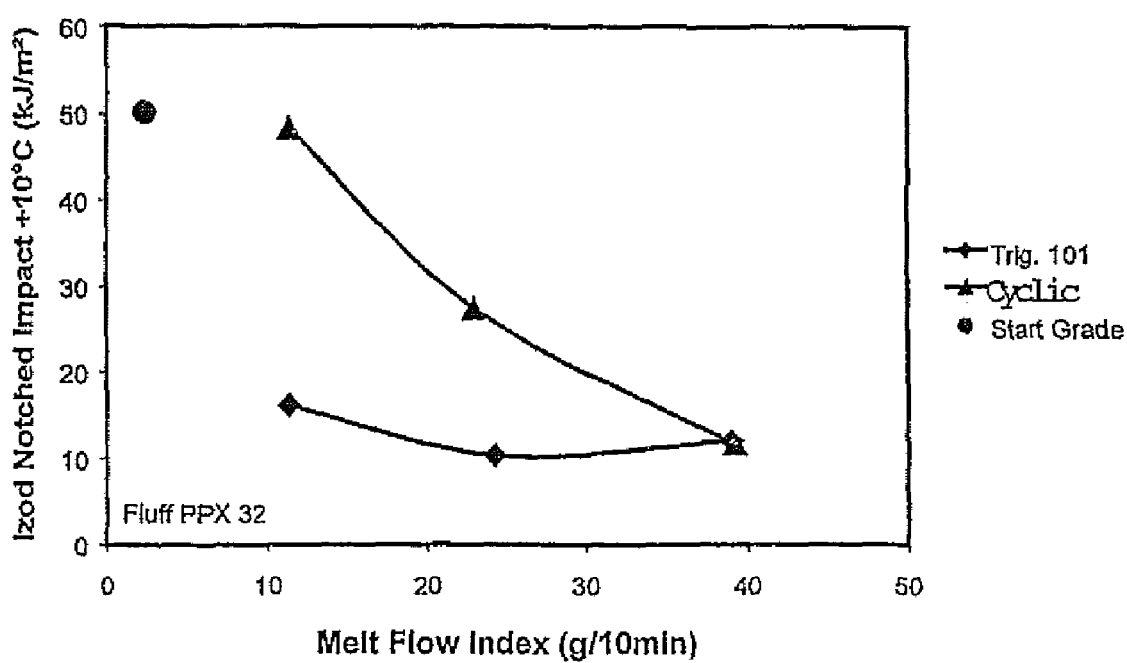
FIG. 4 represents a plot of the Izod notched impact strength at 10° C., expressed in kJ/m$^2$, as a function of the melt flow index, expressed in g/10 min, for an ethylene content in the polypropylene heterophasic copolymer of 13.2 wt % and for an extrusion temperature of 200° C.
Figure 5:
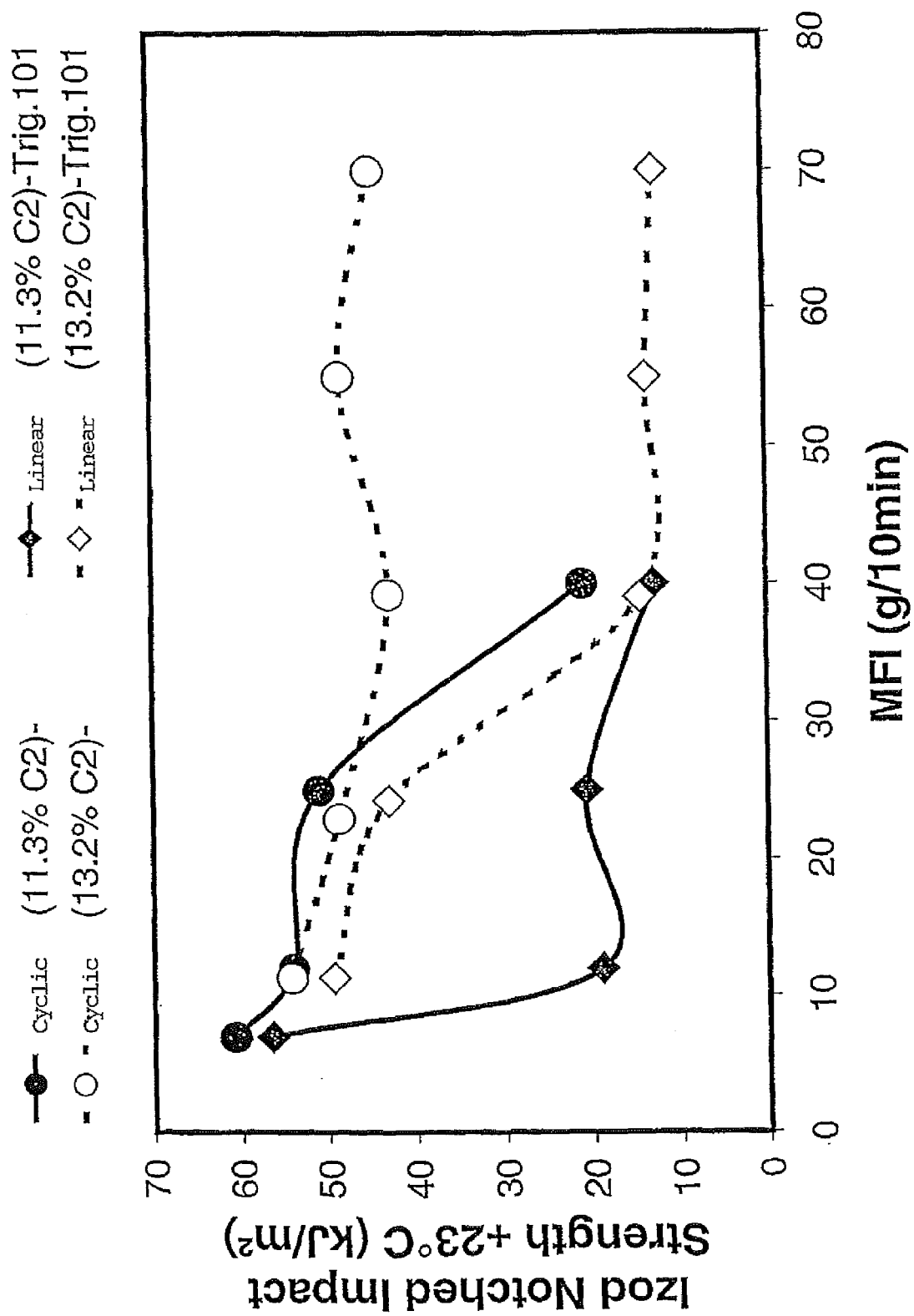
FIG. 5 represents a plot of the Izod notched impact strength at 23° C., expressed in kJ/m$^2$, as a function of the melt flow index, expressed in g/10 min, for ethylene contents in the polypropylene heterophasic copolymer of 11.3 and of 13.2 wt %, and for an extrusion temperature of 200° C.

Controlled rheology resins were prepared based on the MI2=2 g/10 min (ISO 1133) reactor polymerised polypropylene heterophasic copolymer with an ethylene content of 13.2%. Anti-oxidants, calcium stearate (400 ppm), nucleation (talc 3500 ppm) and antistatic agents (glycerol monostearate (GMS) 90% 2000 ppm) were added during extrusion on a single screw Gloenco extruder. Two different peroxide were used: 2,5-di-tert-butyl-2,5-dimethylhexyl peroxide sold by Akzo Nobel Chemicals B.V. under the tradename Trigonox 101 and 3,6,9-Triethyl-3,6,9-Trimethyl-1,4,7-triperoxonane. The degradation ratios were of 6, 12.5 and 20 and the extrusion temperature was 200° C. Melt flow index, flexural modulus and Izod notched impact strength are reported in Table IV. The Izod notched impact strength results are also summarised on FIGS. 3, 4 and 5 for temperatures of +23° C. and +10° C. respectively.

TABLE 4

| Property | Start | Tr. 101 MFI 12 | cyclic MFI 12 | Tr. 101 MFI 25 | cyclic MFI 25 | Tr. 101 MFI 40 | Cyclic MFI 40 | Tr. 101 MFI 70 | Cyclic MFI 70 |
|---|---|---|---|---|---|---|---|---|---|
| MFI (g/10 min) | 2.4 | 11.3 | 11.3 | 24.3 | 23.0 | 39.0 | 39.2 | 70 | 70 |
| Flexural Modulus (MPa) | 1130 | 1040 | 1035 | 990 | 995 | 925 | 980 | | |
| Izod Notched +23° C. (kJ/m$^2$) | 57.7* | 49.4* | 54.2* | 43.1* | 48.7* | 14.5 | 41.7* | 14 | 41 |
| Izod Notched +10° C. (kJ/m$^2$) | 50.1* | 16.0 | 48.3** | 10.3 | 27.4** | 12.1 | 11.9 | | |
| Izod Notched −20° C. (kJ/m$^2$) | 7.5 | 6.4 | 6.6 | 5.6 | 6.2 | 5.7 | 4.9 | | |

*no-break/**no-break of some samples.

All the resins produced with both the linear and cyclic peroxides at an extrusion temperature of 200° C. and for melt flow index of from 12 to 25 g/10 min show 'no break' at room temperature. This in contrast to the results obtained in the previous example prepared by degrading a polypropylene heterophasic copolymer with a lower ethylene content. A higher ethylene content (13.2 vs. 11.3%) thus drastically improves the impact performance of polypropylene heterophasic copolymers.

Changing the peroxide type from linear (Trigonox 101) to cyclic improves the 'no break' performance of the final resin with a melt flow index of 70 g/10 min at a temperature of 23° C.

The resins having a melt flow index of 12 and of 25 g/10 min produced with the cyclic ketone peroxide also show excellent impact performance at a temperature of 10° C.

From these examples, it can be concluded that the cyclic ketone peroxide offers an important mechanical advantage over the linear peroxide Trigonox 101.

It is possible to produce better flow materials that keep their impact strength for a melt flow index as high 70 g/10 min and show 'no-break' from an Izod notched impact test at room temperature. The materials also show a better impact performance at other temperatures.

In almost all cases the flexural modulus is higher.

In conclusion, the resins produced according to the present invention exhibit an improved balance of stiffness, impact, strength and flow properties. The materials produced according to the present invention are thus particularly useful for preparing articles that require simultaneously high melt flow and good impact strength. Indeed high melt flow material is easier and faster to process, particularly in injection moulding, thus allowing shorter cycle time and reduction of the walls' thickness while keeping an acceptable stiffness and impact strength.

The invention claimed is:

1. A method of degrading a polypropylene copolymer which comprises extruding said polypropylene copolymer with a cyclic ketone peroxide to form a solid product of said polypropylene copolymer having a melt index greater than 15 g/10 min with an Izod notched impact strength at 23° C. that is at least 50% higher and a flexural modulus that is at least 30 Mpa higher than the Izod notched impact strength at 23° C. and flexural modulus of a corresponding polypropylene copolymer degraded with a linear peroxide under similar conditions, wherein the extrusion is carried out at a temperature of from 160° C. to less than 200° C. and the polypropylene copolymer is a polypropylene heterophasic copolymer containing from 5 to 20 wt % of ethylene.

2. The method of claim 1 wherein the cyclic ketone peroxide has at least two peroxide groups.

3. The method of claim 1 wherein said cyclic ketone peroxide has a half-life of more than one second at a temperature of 225° C.

4. The method of claim 1 wherein said cyclic ketone peroxide has a half-life of from two to 10 seconds at a temperature of 225° C.

5. The method of claim 1 wherein said polypropylene copolymer is a polypropylene heterophasic copolymer containing ethylene in an amount within the range of 9-15 wt %.

6. The method of claim 5 wherein said polypropylene heterophasic copolymer contains from 11 to 14 wt % ethylene.

7. The method of claim 1 wherein the extrusion temperature is within the range of 160-190° C.

8. The method of claim 1 wherein said cyclic ketone peroxide is 3,6,9-triethyl-3,6,9-trimethyl-1,4,7-triperoxonane.

9. A polymer composition produced by the method of claim 1.

10. An article produced from the composition of claim 9.

11. The article of claim 10 wherein said article is selected from the group consisting of crates, lids, ice cream containers, yogurt beakers, storage bins, pails, technical parts, garden articles, automotive parts, batteries, thin wall packaging, medical waste containers, and suitcases.

* * * * *